US012322330B2

(12) United States Patent
Lin et al.

(10) Patent No.: US 12,322,330 B2
(45) **Date of Patent: *Jun. 3, 2025**

(54) ELECTRONIC DEVICES WITH LOW REFRESH RATE DISPLAY PIXELS

(71) Applicant: Apple Inc., Cupertino, CA (US)

(72) Inventors: Chin-Wei Lin, San Jose, CA (US); Shyuan Yang, San Jose, CA (US); Chuang Qian, Santa Clara, CA (US); Abbas Jamshidi Roudbari, Saratoga, CA (US); Ting-Kuo Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,282

(22) Filed: Oct. 9, 2023

(65) Prior Publication Data

US 2024/0038159 A1 Feb. 1, 2024

Related U.S. Application Data

(60) Continuation of application No. 17/576,619, filed on Jan. 14, 2022, now Pat. No. 11,823,621, which is a (Continued)

(51) Int. Cl.

*G09G 3/32* (2016.01)
*G09G 3/3225* (2016.01)
*G09G 3/3233* (2016.01)

(52) U.S. Cl.

CPC ......... *G09G 3/3225* (2013.01); *G09G 3/3233* (2013.01); *G09G 2300/0417* (2013.01); (Continued)

(58) Field of Classification Search

CPC ... G09G 3/3225; G09G 3/3233; G09G 3/3258
See application file for complete search history.

(56) References Cited

U.S. PATENT DOCUMENTS

| | | | |
|---|---|---|---|
| 8,411,016 | B2 | 4/2013 | Tanikame et al. |
| 9,082,346 | B2 | 7/2015 | Shih |

(Continued)

FOREIGN PATENT DOCUMENTS

| | | | |
|---|---|---|---|
| CN | 1716368 | A | 1/2006 |
| CN | 1874627 | A | 12/2006 |

(Continued)

OTHER PUBLICATIONS

Wang et al., Investigation on VTH Detection Methods for AMOLED Pixel Circuit Design with IGZO-TFT, Chinese Journal of Luminescence, May 31, 2016, pp. 608-615, Issue 5.

(Continued)

*Primary Examiner* — Joseph R Haley
(74) *Attorney, Agent, or Firm* — Treyz Law Group; Jason Tsai

(57) ABSTRACT

A display may have an array of organic light-emitting diode display pixels operating at a low refresh rate. Each display pixel may have six thin-film transistors and one capacitor. One of the six transistors may serve as the drive transistor and may be compensated using the remaining five transistors and the capacitor. One or more on-bias stress operations may be applied before threshold voltage sampling to mitigate first frame dimming. Multiple anode reset and on-bias stress operations may be inserted during vertical blanking periods to reduce flicker and maintain balance and may also be inserted between successive data refreshes to improve first frame performance. Two different emission signals controlling each pixel may be toggled together using a pulse width modulation scheme to help provide darker black levels.

20 Claims, 16 Drawing Sheets

Related U.S. Application Data continuation of application No. 17/080,685, filed on Oct. 26, 2020, now Pat. No. 11,257,426, which is a continuation of application No. 16/696,578, filed on Nov. 26, 2019, now Pat. No. 10,854,139, which is a continuation of application No. 16/379,323, filed on Apr. 9, 2019, now Pat. No. 10,741,121, which is a division of application No. 15/996,366, filed on Jun. 1, 2018, now Pat. No. 10,304,378.

(60) Provisional application No. 62/547,030, filed on Aug. 17, 2017.

(52) U.S. Cl.
CPC ................. *G09G 2300/043* (2013.01); *G09G 2300/0819* (2013.01); *G09G 2300/0861* (2013.01); *G09G 2310/0262* (2013.01); *G09G 2310/0297* (2013.01); *G09G 2310/06* (2013.01); *G09G 2310/061* (2013.01); *G09G 2320/0214* (2013.01); *G09G 2320/0242* (2013.01); *G09G 2320/0247* (2013.01); *G09G 2320/0252* (2013.01); *G09G 2320/043* (2013.01); *G09G 2320/045* (2013.01); *G09G 2320/064* (2013.01); *G09G 2340/0435* (2013.01)

(56) References Cited

U.S. PATENT DOCUMENTS

| | | | | |
|---|---|---|---|---|
| 9,257,074 | B2 | 2/2016 | Tseng | |
| 9,489,875 | B2 | 9/2016 | Hwang et al. | |
| 10,854,139 | B2 | 12/2020 | Lin et al. | |
| 2006/0044236 | A1 | 3/2006 | Kim | |
| 2006/0145989 | A1 | 7/2006 | Han et al. | |
| 2011/0069258 | A1 | 3/2011 | Joo et al. | |
| 2011/0156511 | A1 | 6/2011 | Lau et al. | |
| 2011/0193768 | A1 | 8/2011 | Choi et al. | |
| 2012/0026147 | A1 | 2/2012 | Komiya | |
| 2012/0033000 | A1* | 2/2012 | Takahashi ............ | G09G 3/3233 345/691 |
| 2012/0062536 | A1 | 3/2012 | Park | |
| 2013/0194248 | A1 | 8/2013 | Kim | |
| 2014/0118328 | A1 | 5/2014 | Guo et al. | |
| 2015/0109279 | A1 | 4/2015 | Gupta et al. | |
| 2015/0145849 | A1 | 5/2015 | Choi et al. | |
| 2016/0063921 | A1 | 3/2016 | Tsai et al. | |
| 2016/0124491 | A1 | 5/2016 | An et al. | |
| 2016/0140897 | A1 | 5/2016 | Park et al. | |
| 2016/0351122 | A1* | 12/2016 | Jung .................... | G09G 3/3233 |
| 2016/0351124 | A1 | 12/2016 | Kim et al. | |
| 2016/0379552 | A1 | 12/2016 | Kim et al. | |
| 2018/0226029 | A1 | 8/2018 | Park et al. | |
| 2018/0268760 | A1 | 9/2018 | Chen et al. | |
| 2018/0350307 | A1 | 12/2018 | Tsai | |

FOREIGN PATENT DOCUMENTS

| | | | |
|---|---|---|---|
| CN | 101251977 | A | 8/2008 |
| CN | 102651194 | A | 8/2012 |
| CN | 103137067 | A | 6/2013 |
| CN | 204166873 | U | 2/2015 |
| CN | 104637437 | A | 5/2015 |
| CN | 106205493 | A | 12/2016 |
| CN | 106448554 | A | 2/2017 |
| CN | 206210357 | U | 5/2017 |
| EP | 1744299 | A2 | 1/2007 |
| KR | 101478096 | B1 | 1/2015 |
| TW | 201327527 | A1 | 7/2013 |
| TW | 201403574 | A | 1/2014 |
| TW | 201543441 | A | 11/2015 |
| WO | 2017052727 | A1 | 3/2017 |

OTHER PUBLICATIONS

Jia et al., Simulation of The Stability of a-IGZO TFT-OLED Pixel Circuits, Chinese Journal of Luminescence, Sep. 30, 2013, pp. 1240-1244, Issue 9.

* cited by examiner

ELECTRONIC DEVICES WITH LOW REFRESH RATE DISPLAY PIXELS

This application is a continuation of patent application Ser. No. 17/576,619, filed Jan. 14, 2022, which is a continuation of patent application Ser. No. 17/080,685, filed Oct. 26, 2020, now U.S. Pat. No. 11,257,426, which is a continuation of patent application No. Ser. 16/696,578, filed Nov. 26, 2019, now U.S. Pat. No. 10,854,139, which is a continuation of patent application Ser. No. 16/379,323, filed Apr. 9, 2019, now U.S. Pat. No. 10,741,121, which is a division of application Ser. No. 15/996,366, filed Jun. 1, 2018, now U.S. Pat. No. 10,304,378, which claims the benefit of provisional patent application No. 62/547,030, filed Aug. 17, 2017, which are hereby incorporated by reference herein in their entireties.

FIELD

This relates generally to electronic devices and, more particularly, to electronic devices with displays.

BACKGROUND

Electronic devices often include displays. For example, cellular telephones and portable computers include displays for presenting information to users.

Displays such as organic light-emitting diode displays have an array of display pixels based on light-emitting diodes. In this type of display, each display pixel includes a light-emitting diode and thin-film transistors for controlling application of a signal to the light-emitting diode to produce light.

Threshold voltage variations in the thin-film transistors can cause undesired visible display artifacts. For example, threshold voltage hysteresis can cause white pixels to be displayed differently depending on context. The white pixels in a frame may, as an example, be displayed accurately if they were preceded by a frame of white pixels, but may be displayed inaccurately (i.e., they may have a gray appearance) if they were preceded by a frame of black pixels. This type of history-dependent behavior of the light output of the display pixels in a display causes the display to exhibit a low response time. To address the issues associated with threshold voltage variations, displays such as organic light-emitting diode displays are provided with threshold voltage compensation circuitry. Such circuitry may not, however, adequately address all threshold voltage variations, may not satisfactorily improve response times, and may have a design that is difficult to implement.

SUMMARY

An electronic device may include a display having an array of display pixels. The display pixels may be organic light-emitting diode display pixels. Each display pixel may include a light-emitting diode, a power supply line, a data line, an initialization line, a first transistor with a drain terminal coupled to the data line and a source terminal, a second transistor with a source terminal coupled to the source terminal of the first transistor, a drain terminal, and a gate terminal, a third transistor coupled between the drain and gate terminals of the second transistor, a fourth transistor coupled between the power supply line and the second transistor, a fifth transistor coupled between the second transistor and light-emitting diode, a sixth transistor coupled between the initialization line and the light-emitting diode, and a storage capacitor coupled in series between the third transistor and the sixth transistor.

The third transistor has a gate terminal that receives a first scan signal. The sixth transistor has a gate terminal that receives the first scan signal. The first transistor has a gate terminal that receives a second scan signal that is different than the first scan signal. The fifth transistor has a gate terminal that receives a first emission signal. The fourth transistor has a gate terminal that receives a second emission signal that is different than the first emission signal.

The display pixel may be refreshed using a four-phase refresh scheme, which includes an initialization phase during which only the first scan signal and the second emission signal are asserted, an on-bias stress phase during which only the second scan signal is asserted, a threshold voltage sampling and data writing phase during which only the first and second scan signals are asserted, and an emission phase during which only the first and second emission signals are asserted. Performing the on-bias stress phase before the threshold voltage sampling and data writing phase can help mitigate threshold voltage hysteresis of the second transistor, which prevents first frame dimming (e.g., prevents noticeable luminance dimming when the pixel is transitioning from displaying a black level to a white level).

This type of display pixel may also be suitable for operating in low refresh rate (e.g., 1 Hz, 2 Hz, etc.) in which the vertical blanking period is at least ten times longer than the data refresh period. Multiple anode reset operations may be inserted during the vertical blanking period to help reduce flicker. Additional on-bias stress operations may be performed along with the anode reset operations during the vertical blanking period to help balance the transistor stressing. Multiple data refreshes and multiple anode resets (with on-bias stress) may be applied when the display pixel is transitioning from black to white (or from one gray level to another) to help provide faster threshold voltage settling and improved first frame performance. The first and second emission control signals may also be toggled at the same time using a pulse width modulation (PWM) scheme to control the luminance of the display while reducing leakage.

DETAILED DESCRIPTION

Figure 1:
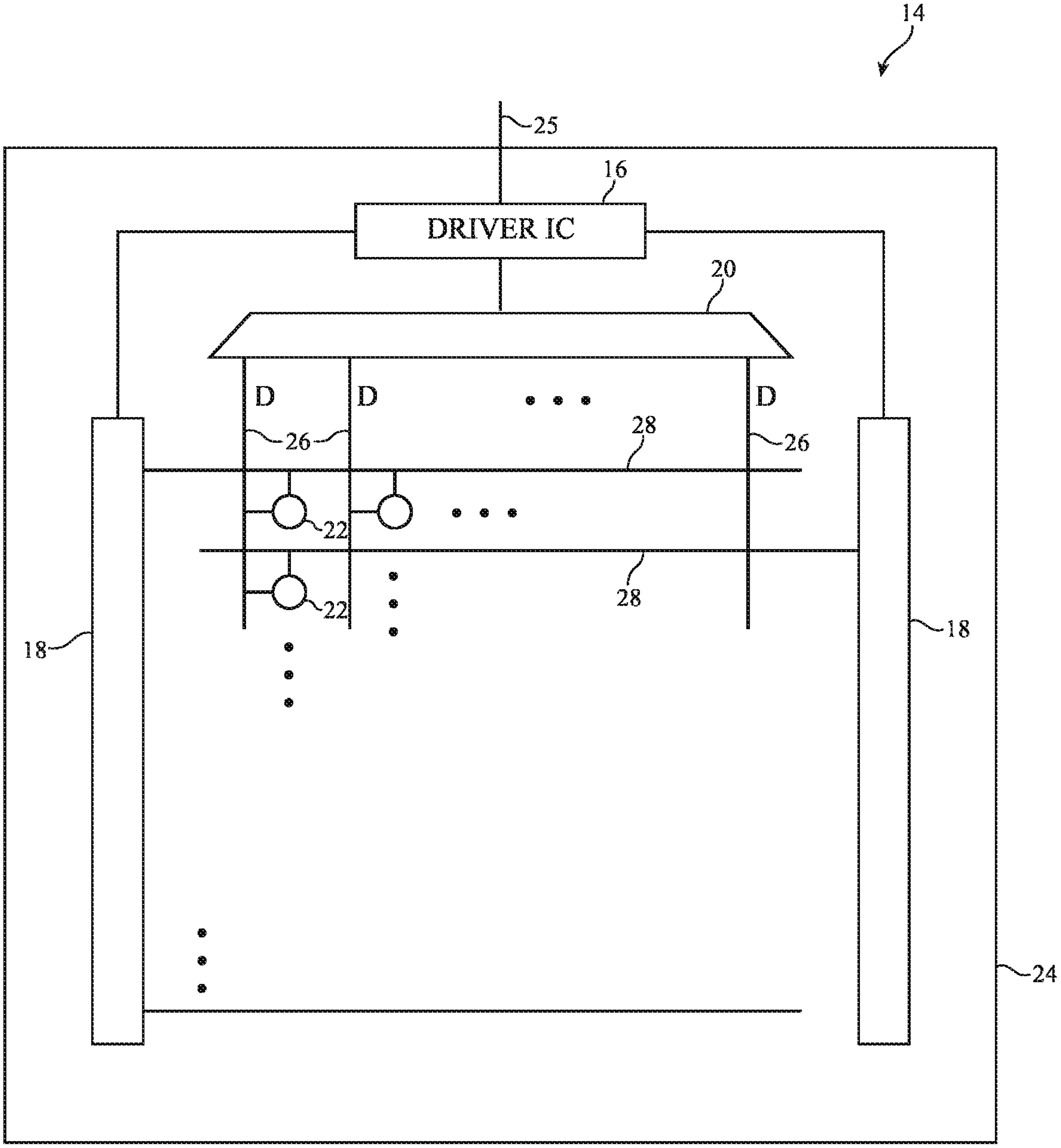
FIG. 1 is a diagram of an illustrative display such as an organic light-emitting diode display having an array of organic light-emitting diode display pixels in accordance with an embodiment.

A display in an electronic device may be provided with driver circuitry for displaying images on an array of display pixels. An illustrative display is shown in FIG. 1. As shown in FIG. 1, display 14 may have one or more layers such as substrate 24. Layers such as substrate 24 may be formed from planar rectangular layers of material such as planar glass layers. Display 14 may have an array of display pixels 22 for displaying images for a user. The array of display pixels 22 may be formed from rows and columns of display pixel structures on substrate 24. These structures may include thin-film transistors such as polysilicon thin-film transistors, semiconducting oxide thin-film transistors, etc. There may be any suitable number of rows and columns in the array of display pixels 22 (e.g., ten or more, one hundred or more, or one thousand or more).

Display driver circuitry such as display driver integrated circuit 16 may be coupled to conductive paths such as metal traces on substrate 24 using solder or conductive adhesive. Display driver integrated circuit 16 (sometimes referred to as a timing controller chip) may contain communications circuitry for communicating with system control circuitry over path 25. Path 25 may be formed from traces on a flexible printed circuit or other cable. The system control circuitry may be located on a main logic board in an electronic device such as a cellular telephone, computer, television, set-top box, media player, portable electronic device, or other electronic equipment in which display 14 is being used. During operation, the system control circuitry may supply display driver integrated circuit 16 with information on images to be displayed on display 14 via path 25. To display the images on display pixels 22, display driver integrated circuit 16 may supply clock signals and other control signals to display driver circuitry such as row driver circuitry 18 and column driver circuitry 20. Row driver circuitry 18 and/or column driver circuitry 20 may be formed from one or more integrated circuits and/or one or more thin-film transistor circuits on substrate 24.

Row driver circuitry 18 may be located on the left and right edges of display 14, on only a single edge of display 14, or elsewhere in display 14. During operation, row driver circuitry 18 may provide row control signals on horizontal lines 28 (sometimes referred to as row lines or "scan" lines). Row driver circuitry 18 may therefore sometimes be referred to as scan line driver circuitry. Row driver circuitry 18 may also be used to provide other row control signals, if desired.

Column driver circuitry 20 may be used to provide data signals D from display driver integrated circuit 16 onto a plurality of corresponding vertical lines 26. Column driver circuitry 20 may sometimes be referred to as data line driver circuitry or source driver circuitry. Vertical lines 26 are sometimes referred to as data lines. During compensation operations, column driver circuitry 20 may use paths such as vertical lines 26 to supply a reference voltage. During programming operations, display data is loaded into display pixels 22 using lines 26.

Each data line 26 is associated with a respective column of display pixels 22. Sets of horizontal signal lines 28 run horizontally through display 14. Power supply paths and other lines may also supply signals to pixels 22. Each set of horizontal signal lines 28 is associated with a respective row of display pixels 22. The number of horizontal signal lines in each row may be determined by the number of transistors in the display pixels 22 that are being controlled independently by the horizontal signal lines. Display pixels of different configurations may be operated by different numbers of control lines, data lines, power supply lines, etc.

Row driver circuitry 18 may assert control signals on the row lines 28 in display 14. For example, driver circuitry 18 may receive clock signals and other control signals from display driver integrated circuit 16 and may, in response to the received signals, assert control signals in each row of display pixels 22. Rows of display pixels 22 may be processed in sequence, with processing for each frame of image data starting at the top of the array of display pixels and ending at the bottom of the array (as an example). While the scan lines in a row are being asserted, the control signals and data signals that are provided to column driver circuitry 20 by circuitry 16 direct circuitry 20 to demultiplex and drive associated data signals D onto data lines 26 so that the display pixels in the row will be programmed with the display data appearing on the data lines D. The display pixels can then display the loaded display data.

Figure 2:
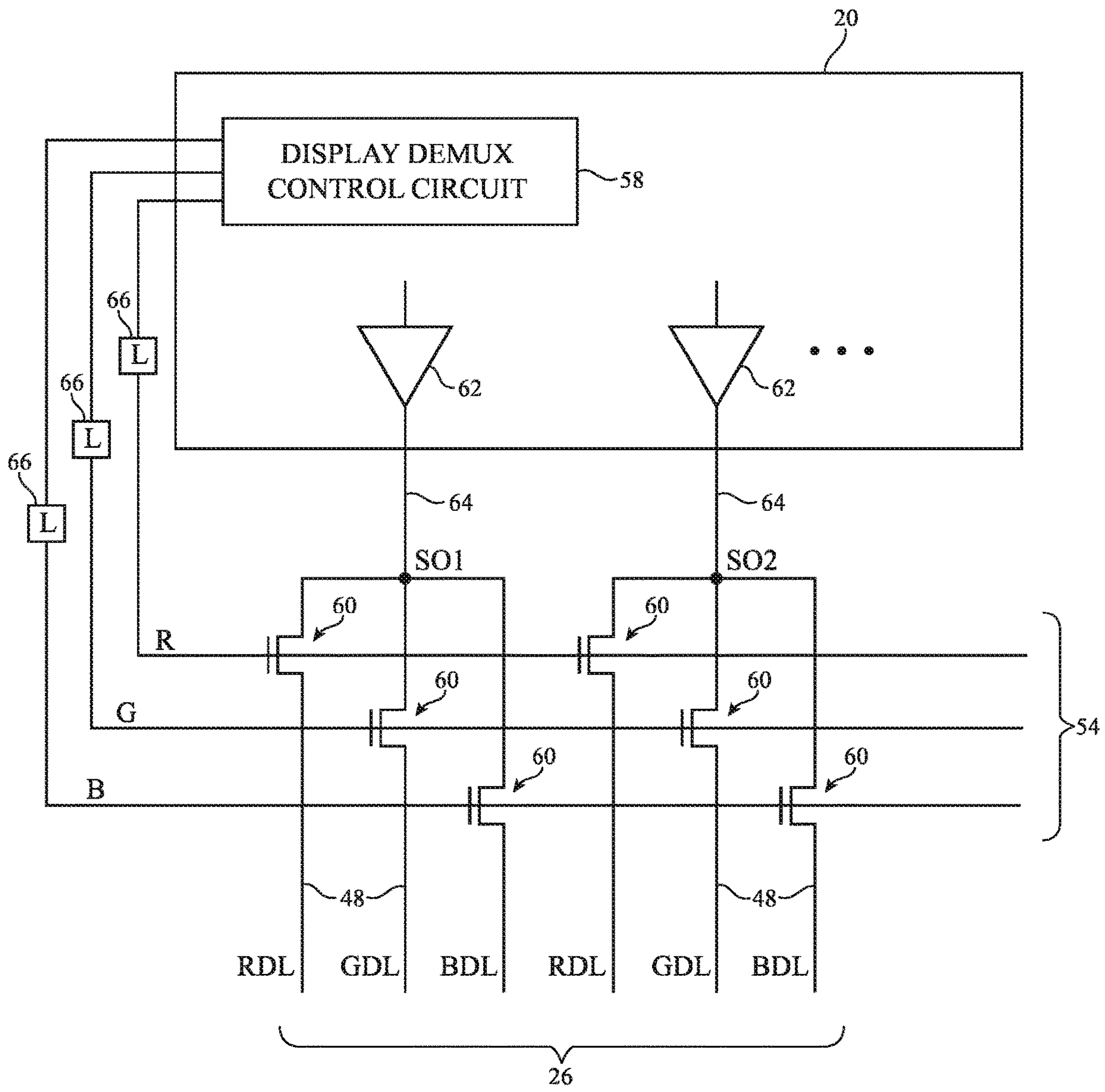
FIG. 2 is a circuit diagram of an illustrative display driver circuitry in accordance with an embodiment.

Column driver circuitry 20 may output data line signals that contain grayscale information for multiple color channels, such as red, green, and blue channels (see, e.g., FIG. 2). Demultiplexing circuitry 54 may demultiplex this data line signal into respective R, G, and B data line signals on respective data lines 48. As shown in the example of FIG. 2, a display demultiplexer control circuit such as display demultiplexer control circuit 58 in column circuitry 20 may be used to supply data line demultiplexer control signals R, G, and B (corresponding to red, green, and blue channels in this example) to the gate terminals of demultiplexing transistors 60. Data line drivers 62 may produce data line output signals SO1, SO2, . . . (sometimes referred to as source output signals) on data line paths 64. The source output signals contain analog pixel data for image pixels of all three colors (i.e., red, blue, and green). The control signals that are applied to the gates of demultiplexing transistors 60 turn transistors 60 on and off in a pattern that routes red channel information from the source output signals to red data lines RDL, that routes green channel information from the source output signals to green data lines GDL, and that routes blue channel information from the source output signals to blue data lines BDL.

Optional loading circuits 66 may be implemented using one or more discrete components (e.g., capacitors, inductors, and resistors) that are interposed within lines 54 or may be implemented in a distributed fashion using some or all of the structures that form lines 54. Optional loading circuits 66 and/or circuitry in column driver circuitry 20 (e.g., circuit 58) may be used to control the shape of the demultiplexing control signals R, G, and B. Signal shaping techniques such as these may be used to smooth display control signal pulses such as the demultiplexer control signal pulses and thereby reduce harmonic signal production and radio-frequency interference.

In an organic light-emitting diode display such as display 14, each display pixel contains a respective organic light-emitting diode for emitting light. A drive transistor controls the amount of light output from the organic light-emitting diode. Control circuitry in the display pixel is configured to perform threshold voltage compensation operations so that the strength of the output signal from the organic light-emitting diode is proportional to the size of the data signal loaded into the display pixel while being independent of the threshold voltage of the drive transistor.

Figure 3:
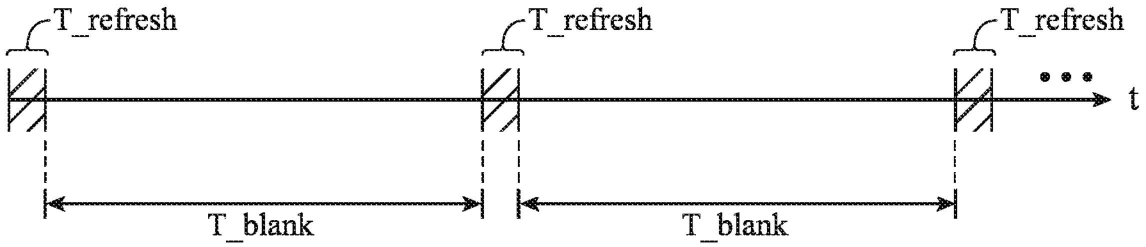
FIG. 3 is a diagram of a low refresh rate display driving scheme in accordance with an embodiment.

Display 14 may be configured to support low refresh rate operation. Operating display 14 using a relatively low refresh rate (e.g., a refresh rate of 1 Hz, 2 Hz, or other suitably low rate) may be suitable for applications outputting content that is static or nearly static and/or for applications that require minimal power consumption. FIG. 3 is a diagram of a low refresh rate display driving scheme in accordance with an embodiment. As shown in FIG. 3, display 14 may alternative between a short data refresh phase (as indicated by period T_refresh) and an extended vertical blanking phase (as indicated by period T_blank). As an example, each data refresh period T_refresh may be approximately 16.67 milliseconds (ms) in accordance with a 60 Hz data refresh operation, whereas each vertical blanking period T_blank may be approximately 1 second so that the overall refresh rate of display 14 is lowered to 1 Hz. Configured as such, T_blank can be adjusted to tune the overall refresh rate of display 14. For example, if the duration of T_blank was tuned to half a second, the overall refresh rate would be increased to approximately 2 Hz. In the embodiments described herein, T_blank may be at least two times, at least ten times, at least 30 times, or at least 60 times longer in duration than T_refresh (as examples).

Figure 4:
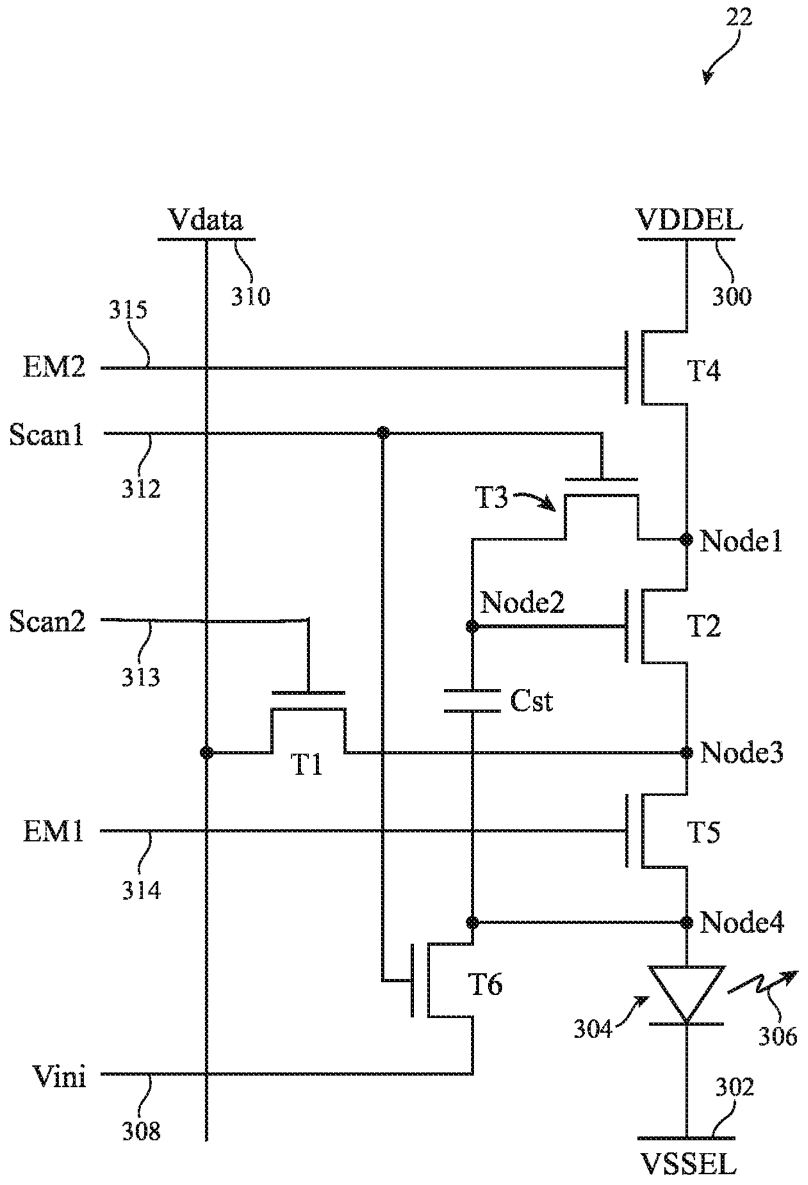
FIG. 4 is a circuit diagram of an illustrative organic light-emitting diode display pixel in accordance with an embodiment.

A schematic diagram of an illustrative organic light-emitting diode display pixel 22 in display 14 that can be used to support low refresh rate operation is shown in FIG. 4. As shown in FIG. 4, display pixel 22 may include a storage capacitor Cst and transistors such as n-type (i.e., n-channel) transistors T1, T2, T2, T3, T4, T5, and T6. The transistors of pixel 22 may be thin-film transistors formed from a semiconductor such as silicon (e.g., polysilicon deposited using a low temperature process, sometimes referred to as LTPS or low-temperature polysilicon), semiconducting oxide (e.g., indium gallium zinc oxide (IGZO)), etc.

In one suitable arrangement, transistor T3 may be implemented as a semiconducting-oxide transistor while remaining transistors T1, T2, and T4-T6 are silicon transistors. Semiconducting-oxide transistors exhibit relatively lower leakage than silicon transistors, so implementing transistor T3 as a semiconducting-oxide transistor will help reduce flicker at low refresh rates (e.g., by preventing current from leakage through T3).

In another suitable arrangement, transistors T3 and T6 may be implemented as semiconducting-oxide transistors while remaining transistors T1, T2, T4, and T5 are silicon transistors. Since both transistors T3 and T6 are controlled by signal Scan1, forming them as the same transistor type can help simplify fabrication. In yet another suitable arrangement, transistors T3, T6, and also T2 may be implemented as semiconducting-oxide transistors while remaining transistors T1, T4, and T5 are silicon transistors. Transistor T2 serves as the drive transistor and has a threshold voltage that is critical to the emission current of pixel 22. As described below in connection with at least FIG. 7, the threshold voltage of the drive transistor may experience hysteresis. Thus, forming the drive transistor as a top-gate semiconducting-oxide transistor can help reduce the hysteresis (e.g., a top-gate IGZO transistor experiences less Vth hysteresis than a silicon transistor). If desired, all of transistors T1-T6 may be semiconducting-oxide transistors. Moreover, any one or more of transistors T1-T6 may be p-type (i.e., p-channel) thin-film transistors.

Display pixel 22 may include light-emitting diode 304. A positive power supply voltage VDDEL may be supplied to positive power supply terminal 300 and a ground power supply voltage VSSEL (e.g., 0 volts or other suitable voltage) may be supplied to ground power supply terminal 302. The state of drive transistor T2 controls the amount of current flowing from terminal 300 to terminal 302 through diode 304, and therefore the amount of emitted light 306 from display pixel 22. Diode 304 may have an associated parasitic capacitance $C_{OLED}$ (not shown).

Terminal 308 is used to supply an initialization voltage Vini (e.g., a negative voltage such as −1 V or −2 V or other suitable voltage) to assist in turning off diode 304 when diode 304 is not in use. Control signals from display driver circuitry such as row driver circuitry 18 of FIG. 1 are supplied to control terminals such as terminals 312, 313, 314, and 315. Terminals 312 and 313 may serve respectively as first and second scan control terminals, whereas terminals 314 and 315 may serve respectively as first and second emission control terminals. Scan control signals Scan1 and Scan2 may be applied to scan terminals 312 and 313, respectively. Emission control signals EM1 and EM2 may be supplied to terminals 314 and 315, respectively. A data input terminal such as data signal terminal 310 is coupled to a respective data line 26 of FIG. 1 for receiving image data for display pixel 22.

In the example of FIG. 4, transistors T4, T2, T5, and diode 304 may be coupled in series between power supply terminals 300 and 302. In particular, transistor T4 may have a drain terminal that is coupled to positive power supply terminal 300, a gate terminal that receives emission control signal EM2, and a source terminal (labeled as Node1). The terms "source" and "drain" terminals of a transistor can sometimes be used interchangeably and may therefore be referred to herein as "source-drain" terminals. Drive transistor T2 may have a drain terminal that is coupled to Node1, a gate terminal (labeled as Node2), and a source terminal (labeled as Node3). Transistor T5 may have a drain terminal that is coupled to Node3, a gate terminal that receives emission control signal EM1, and a source terminal (labeled as Node4) that is coupled to ground power supply terminal 302 via diode 304.

Transistor T3, capacitor Cst, and transistor T6 may be coupled in series between Node1 and power supply terminal 308. Transistor T3 may have a drain terminal that is coupled to Node1, a gate terminal that receives scan control signal Scan1, and a source terminal that is coupled Node2. Storage capacitor Cst may have a first terminal that is coupled to Node2 and a second terminal that is coupled to Node4. Transistor T6 may have a drain terminal that is coupled to Node4, a gate terminal that receives scan control signal Scan1, and a source terminal that receives voltage Vini via terminal 308. Transistor T1 may have a drain terminal that receives data line signal DL via terminal 310, a gate terminal that receives scan control signal Scan2, and a source terminal that is coupled to Node3. Connected in this way, signal EM2 may be asserted to enable transistor T4; signal EM1 may be asserted to activate transistor T5; signal Scan2 may be asserted to turn on transistor T1; and signal Scan1 may be asserted to switch into use transistors T3 and T6.

Figure 5:
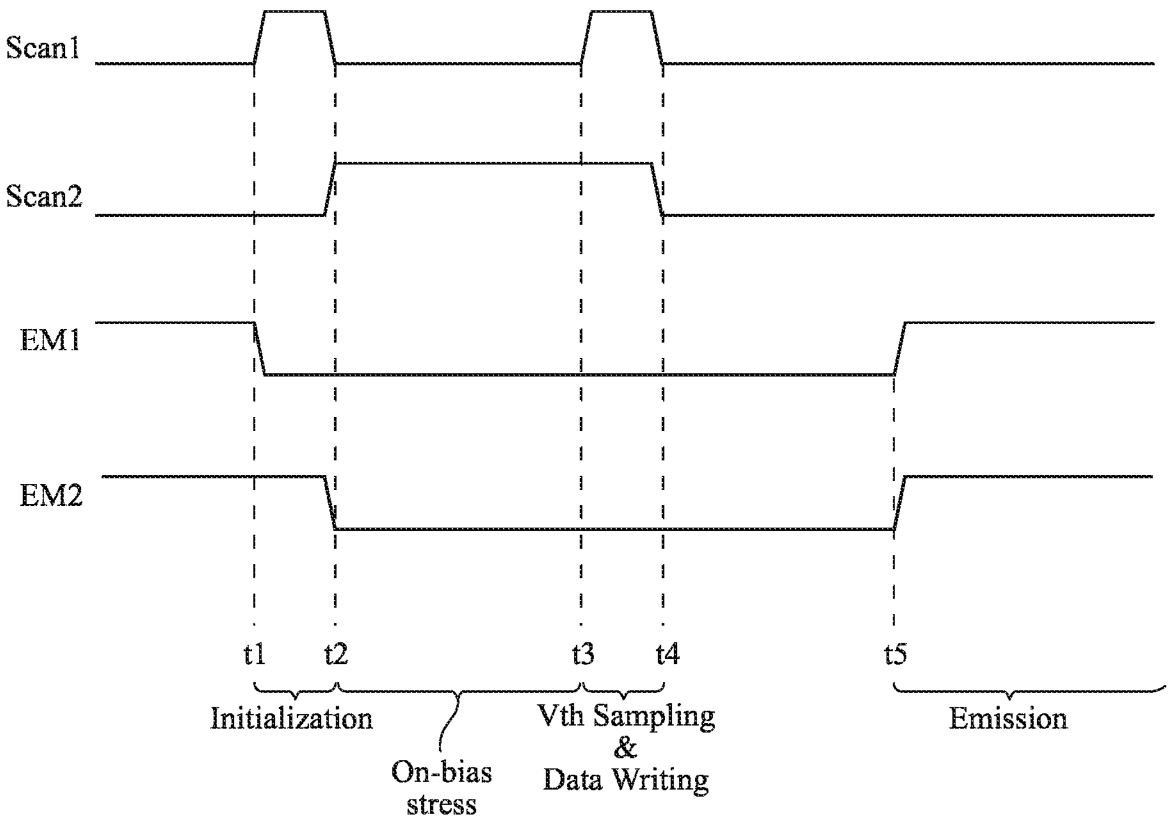
FIG. 5 is a timing diagram showing how on-bias stress may be applied before threshold voltage sampling in accordance with an embodiment.

During the data refresh period, display pixel 22 may be operated in at least four phases: (1) a reset/initialization phase, (2) an on-bias stress phase, (3) a threshold voltage sampling and data writing phase, and (4) an emission phase. FIG. 5 is a timing diagram showing relevant signal waveforms that may be applied to display pixel 22 during the four phases of the data refresh operation.

Figure 6A:
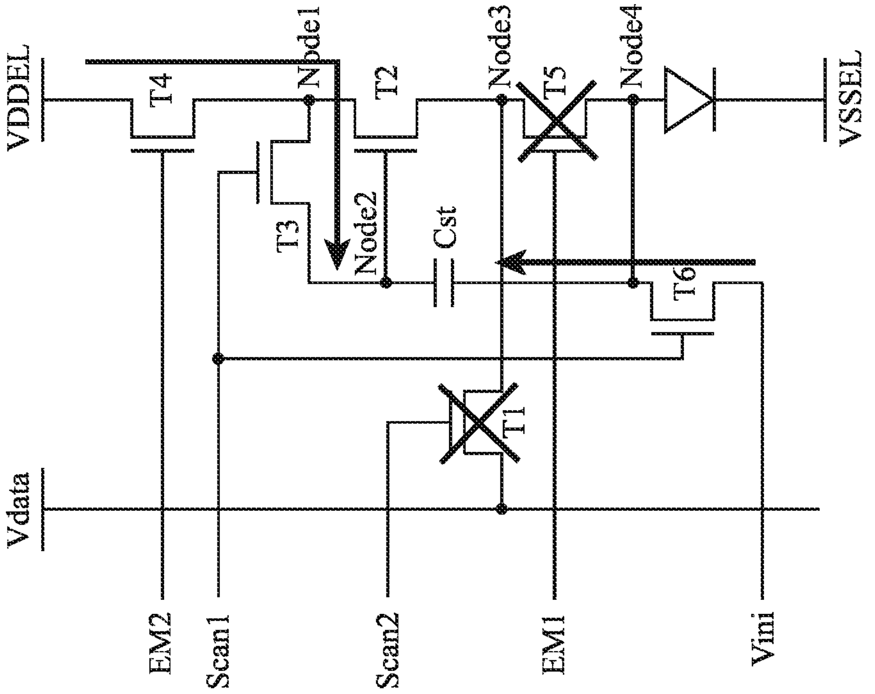
FIGS. 6A-6D are diagrams showing the configuration of the display pixel of FIG. 4 during the four different phases shown in FIG. 5 in accordance with an embodiment.

At time t1 (at the beginning of the initialization phase), signal Scan1 may be pulsed high and signal EM1 may be deasserted (e.g., driven low) while signal Scan2 is low and signal EM2 is high. FIG. 6A illustrates the configuration of pixel 22 during this time. As shown in FIG. 6A, only transistors T3, T4, and T6 are turned on (since signals Scan1 and EM2 are asserted), so the first terminal of capacitor Cst is charged to VDDEL and the second terminal of capacitor Cst is pulled down to Vini. During the initialization phase, the voltage across capacitor Cst is therefore reset to a predetermined voltage difference (VDDEL−Vini). Node3 may also be charged up to (VDDEL−Vth2), where Vth2 is the threshold voltage of transistor T2.

Figure 6B:
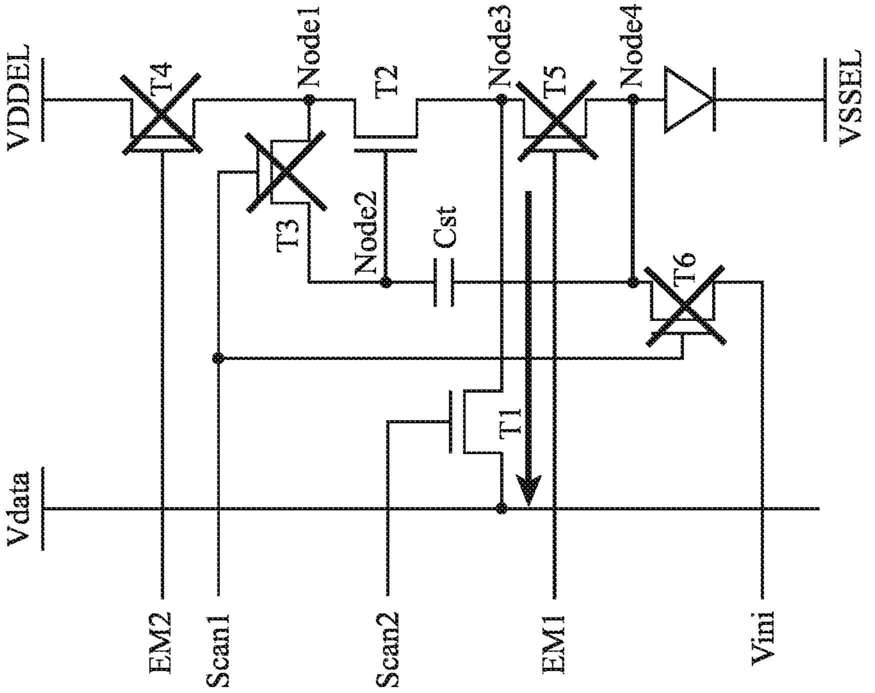

At time t2, signal Scan1 falls low, signal Scan2 is asserted (e.g., driven high), and signal EM2 is deasserted (e.g., driven low), which signifies the end of the initialization phase and the beginning of the on-bias stress phase. FIG. 6B illustrates the configuration of pixel 22 during this time. As shown in FIG. 6B, only transistors T1 and T2 are turned on (since signal Scan2 is high and Node2 is charged up during the initialization phase). Configured in this way, Node2 remains at VDDEL, and Node3 will be biased to Vdata using transistor T1. In other words, the gate-to-source voltage Vgs of transistor T2 will be set to (VDDEL−Vdata). Vdata is at least partially applied to transistor T2 before any threshold voltage sampling.

Figure 6C:
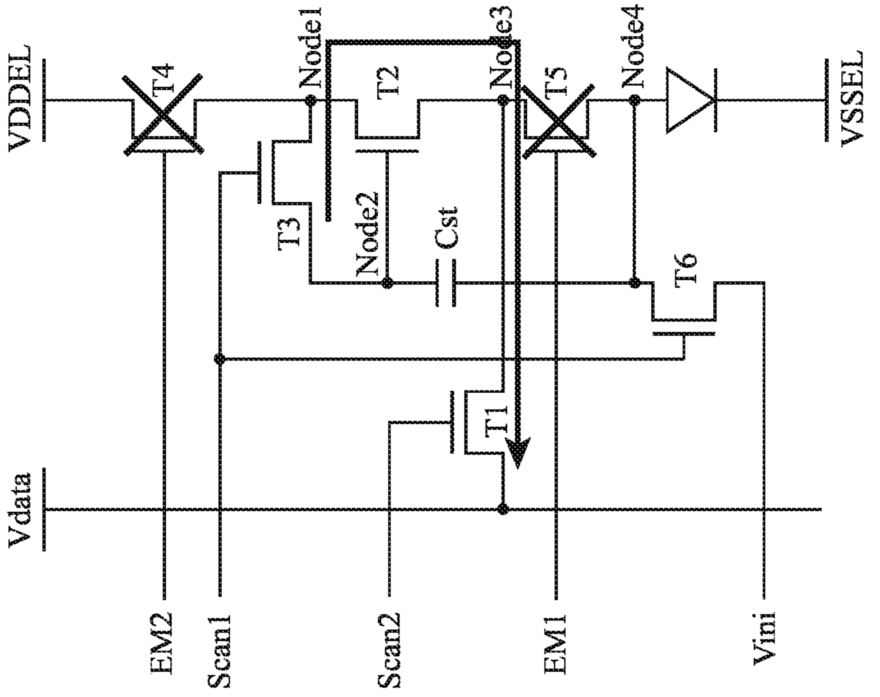

At time t3, signal Scan1 pulses high, which signifies the end of the on-bias stress phase and the beginning of the threshold voltage Vth sampling and data writing phase. FIG. 6C illustrates the configuration of pixel 22 during this time. As shown in FIG. 6C, only transistors T1, T2, and T6 are turned on (since signals Scan1 and Scan2 are asserted). Configured in this way, Node1 and Node2 will be pulled from VDDEL down to (Vdata+Vth2) while Node3 is set to Vdata. In other words, the gate-to-source voltage Vgs of transistor T2 will be set to Vth2 (i.e., Vdata+Vth2−Vdata, where Vdata cancels out). The voltage across capacitor Cst is (Vdata+Vth2−Vini). At time t4, both Scan1 and Scan2 are deasserted, signifying the end of the threshold voltage and data writing phase.

Figure 6D:
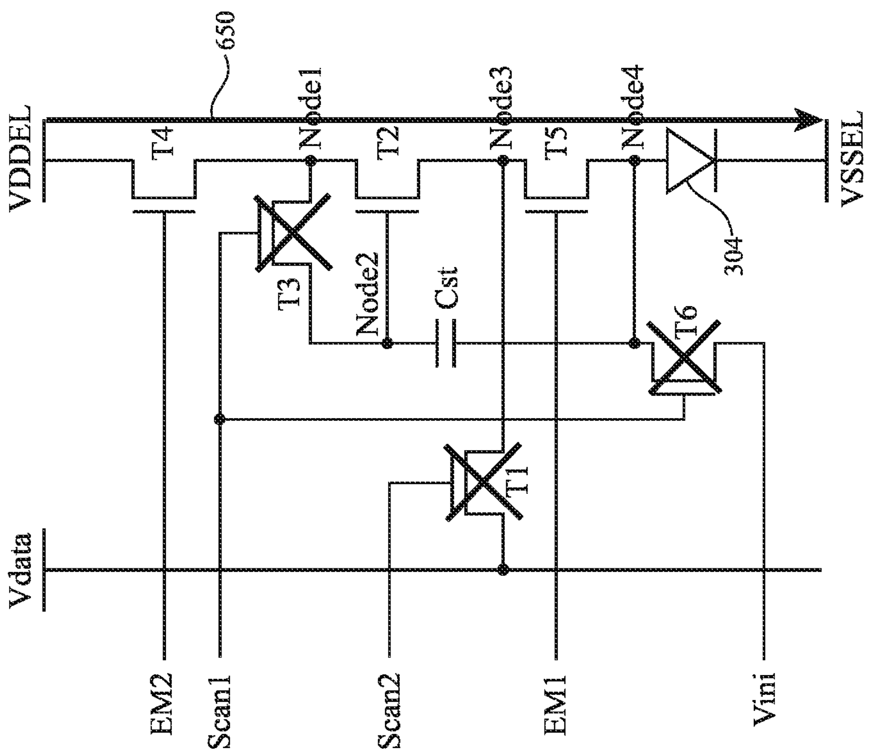

At time t5, signals EM1 and EM2 are asserted to signify the beginning of the emission phase. FIG. 6D illustrates the configuration of pixel 22 during this time. As shown in FIG. 6D, transistors T2, T4, and T5 are turned on to allow an emission current 650 to flow through diode 304. The gate-to-source voltage Vgs of transistor T2 will be set by the voltage across storage capacitor Cst, which was previously set to (Vdata+Vth2−Vini) during the data writing phase. Since emission current 650 is proportion to Vgs minus Vth2, emission current 650 will be independent of Vth2 since Vth2 cancels out when subtracting Vth2 from (Vdata+Vth2−Vini).

Figure 7:
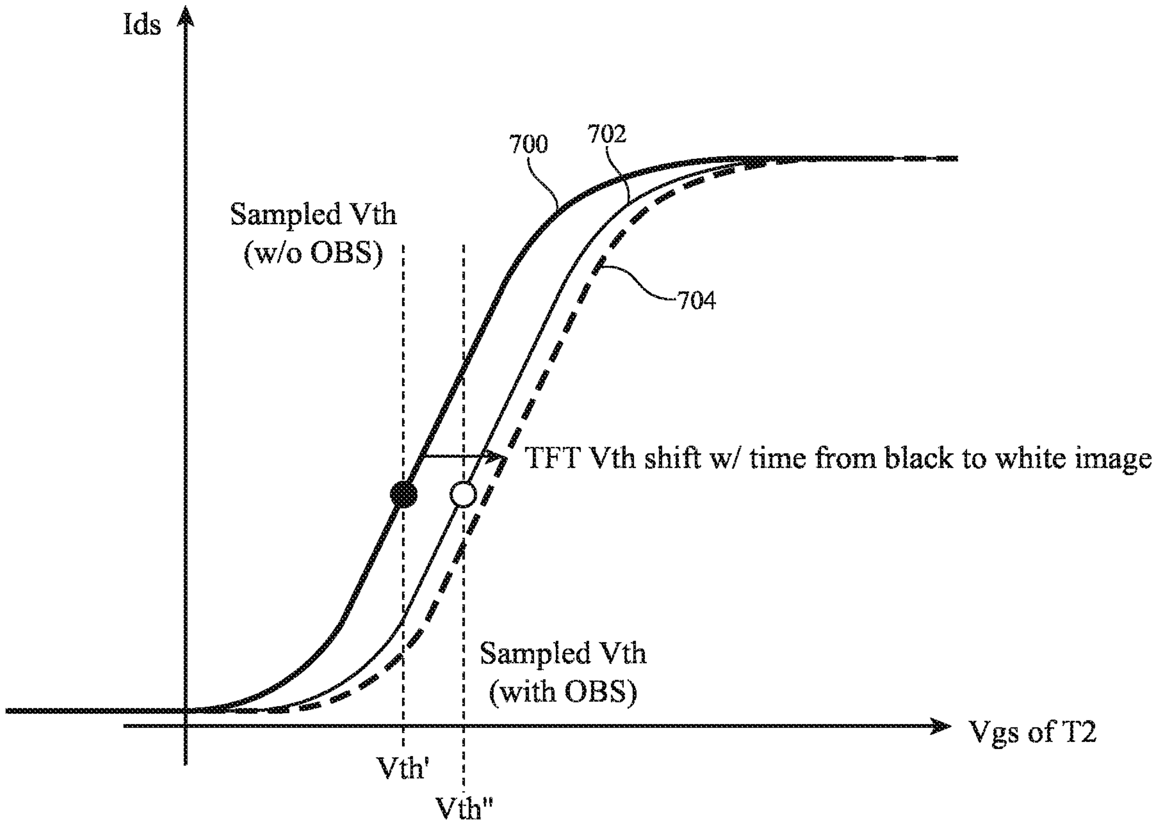
FIG. 7 is a diagram illustrating a thin-film transistor hysteresis effect that causes first frame dimming in accordance with an embodiment.

In certain situations, threshold voltage Vth2 can shift, such as when display 14 is transitioning from a black image to a white image or when transitioning from one gray level to another. This shifting in Vth2 (sometimes referred to herein as thin-film transistor "hysteresis") can cause a reduction in luminance, which is otherwise known as "first frame dimming." The TFT hysteresis is illustrated in FIG. 7. As shown in FIG. 7, curve 700 represents the saturation current Ids waveform as a function of Vgs of transistor T2 for a black frame, whereas curve 704 represents the target Ids waveform as a function of Vgs of transistor T2 for a white frame. Without performing the on-bias stress, the sampled Vth' corresponds to the black frame and will therefore deviate from the target curve 702 by quite a large margin. By performing the on-bias stress, the sampled Vth" will correspond to Vdata and will therefore be much closer to the target curve 702 (see curve 702 realized by applying the on-bias stress). Performing the on-bias stress phase to bias the Vgs of transistor T2 with Vdata before sampling Vth2 can therefore help mitigate hysteresis and prevent first frame dimming.

Figure 8A:
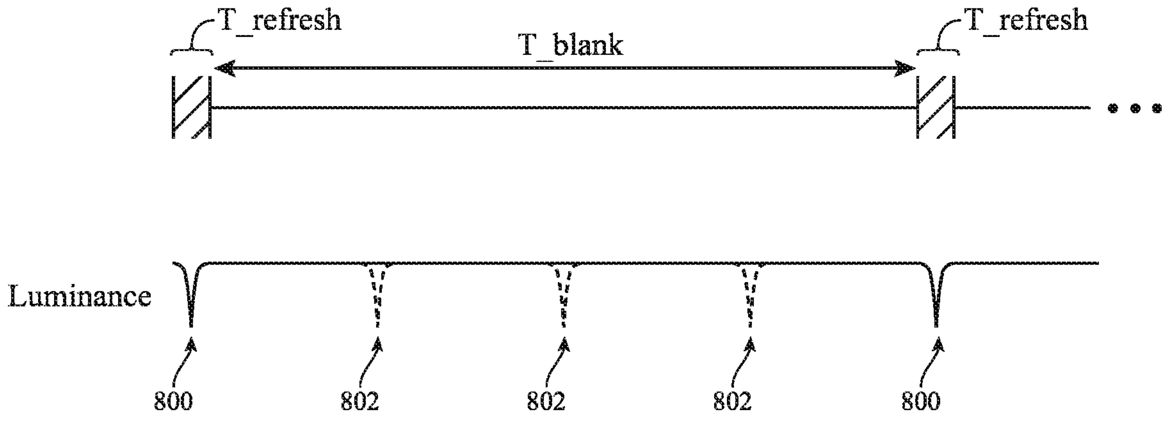
FIG. 8A is a timing diagram showing how one or more anode reset operations can be performed during the extended blanking period in accordance with an embodiment.

Another issue that may arise when operating display 14 under low refresh rates is the emission current only being toggled during the data refresh periods. FIG. 8A shows display luminance as a function of time. As shown in FIG. 8, the luminance may experience dips 800 during data refresh periods T_refresh. The luminance dips 800 are caused by sequentially shutting off and then turning on transistor T4, such as during the four phases shown in FIG. 5-6. Having luminance dips 800 at 1 Hz may result in noticeable flicker to the user.

In an effort to eliminate flicker, additional luminance dips 802 may be inserted during the vertical blanking period T_blank. In the example of FIG. 8A, three additional dips 802 are inserted, which is merely illustrative. In general, at least 10 dips, at least 100 dips, or more than 100 dips may be produced during the extended blanking period T_blank. By artificially and intentionally generating luminance dips at a higher frequency, the flickering is less noticeable to the human eye.

Figure 8B:
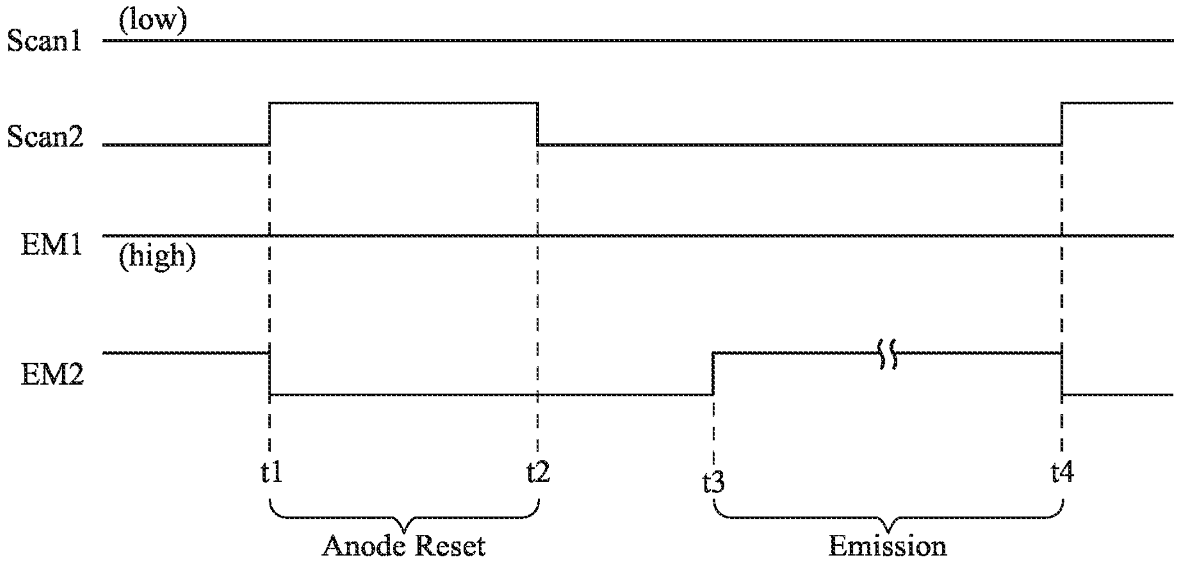
FIG. 8B is a timing diagram showing the behavior of relevant signals during the anode reset operations shown in FIG. 8A in accordance with an embodiment.
Figure 9A:
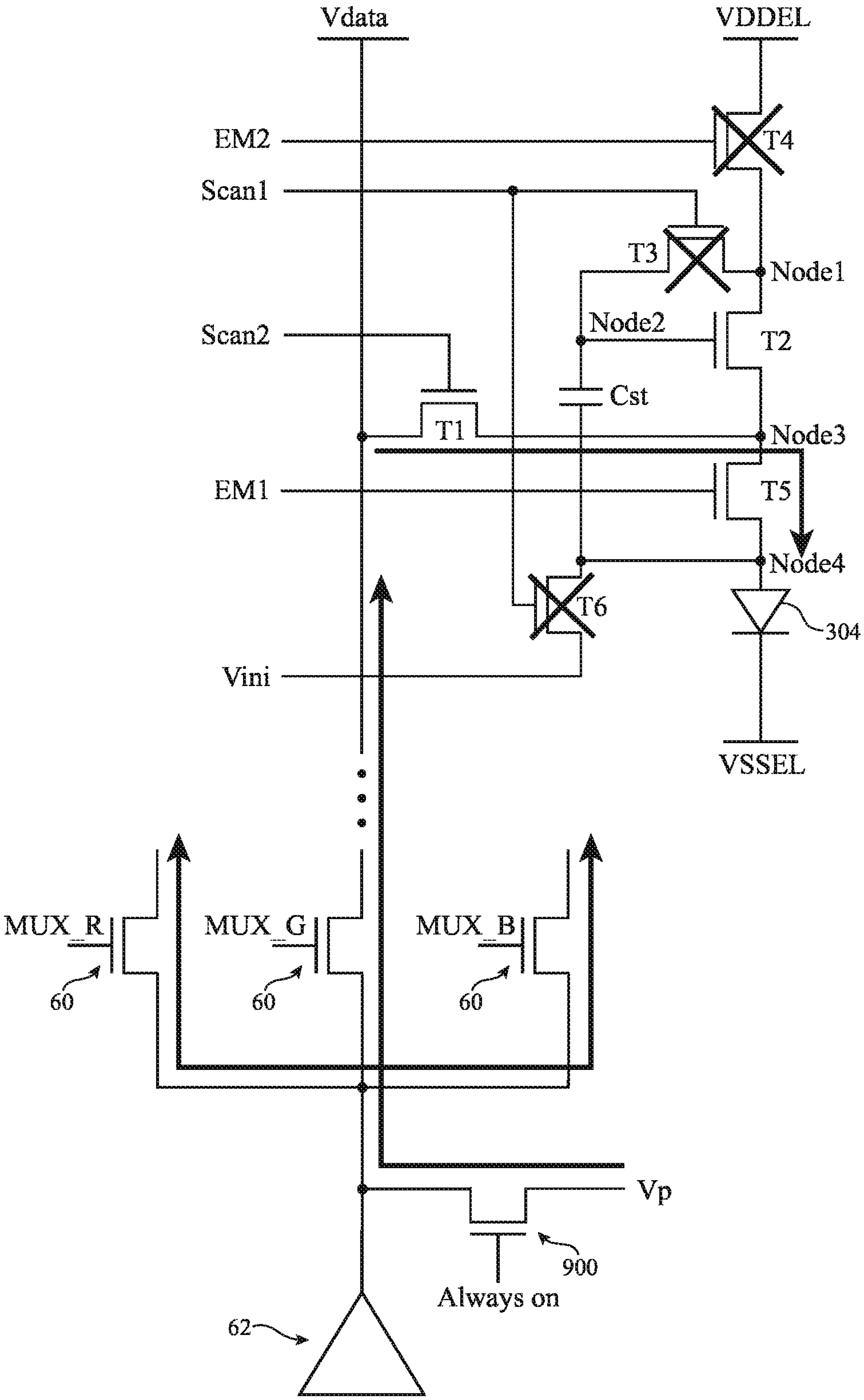
FIGS. 9A and 9B are diagrams showing the configuration of the display pixel of FIG. 4 during the two different phases shown in FIG. 8B in accordance with an embodiment.

Dips 802 during the blanking period may be produced by alternating between an anode reset phase and the emission phase. FIG. 8B is a timing diagram showing the behavior of relevant signals during the anode reset phase and the emission phase. At time t1, signal Scan2 may be pulsed high and signal EM2 may be deasserted (e.g., EM2 may be driven low) while signal Scan1 remains low and signal EM1 remains high. FIG. 9A illustrates the configuration of pixel 22 during this time. As shown in FIG. 9A, transistors T1 and T5 are turned on (since signals Scan2 and EM1 are asserted), so Node4 (which is the anode of diode 304) will be reset to voltage Vp via transistor 900. The data signal may be parked or held at voltage Vp during the blanking interval. Voltage Vp may, for example, be at VSSEL, 2 V, or any data voltage level in between VSSEL and 2 V. Source driver 62 (see also FIG. 2) will be deactivated during this time. Transistor T4 is turned off so no emission current can flow during the anode reset phase. At time t2, signal Scan2 is driven low, which marks the end of the anode reset phase.

Figure 9B:
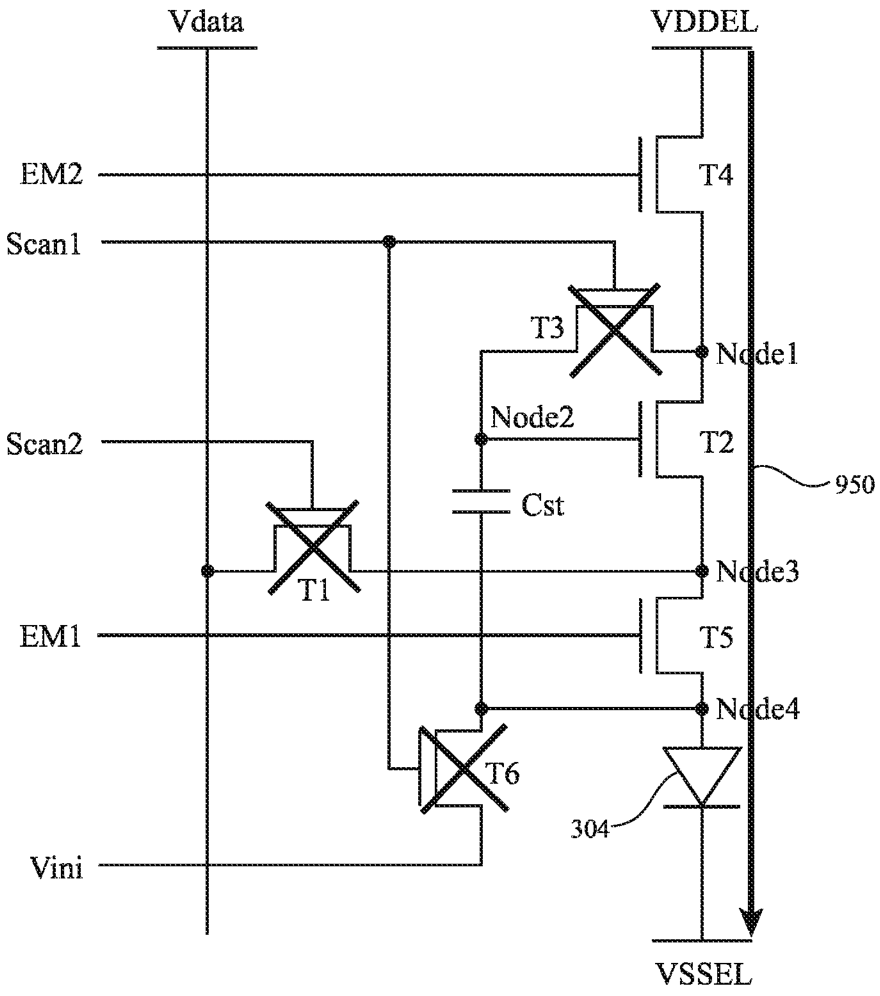

At time t3, signal EM2 is asserted (e.g., EM2 is driven high), which reactivates transistor T4. FIG. 9B illustrates the configuration of pixel 22 during this time. As shown in FIG. 9B, transistors T4, T2, and T5 are all turned on, so emission current 950 will flow through diode 304. Emission current 950 will continue to flow until the next anode reset phase, which occurs at time t4. The period of time from t3 to t4 therefore delineates the emission phase. The diagram of FIG. 8B is not drawn to scale. In general, the emission phase may be longer than the anode reset phase. It is also possible for the emission phase to be shorter than the anode reset phase. The anode reset operation can be performed as frequently as necessary (e.g., to produce as many luminance dips 802 as desired during the vertical blanking period) to help reduce or minimize low refresh rate flicker.

Figure 10:
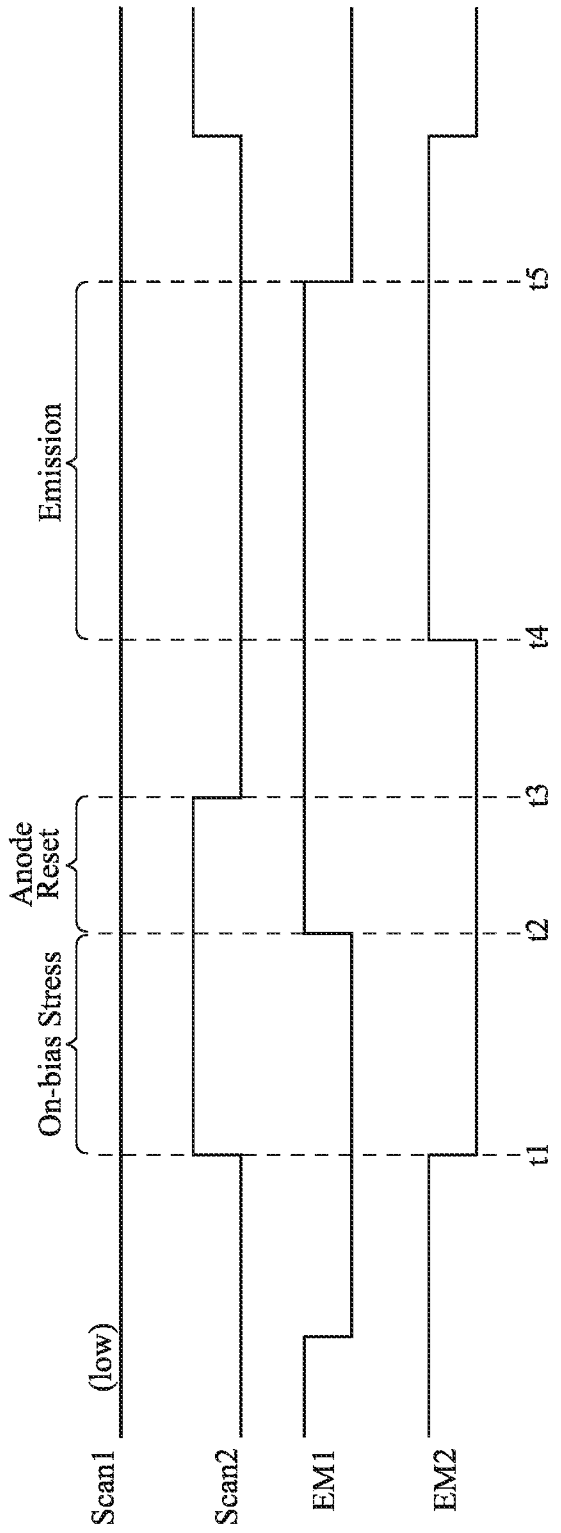
FIG. 10 is a timing diagram showing how on-bias stress may be applied before anode reset during the extended blanking period in accordance with an embodiment.
Figure 11B:
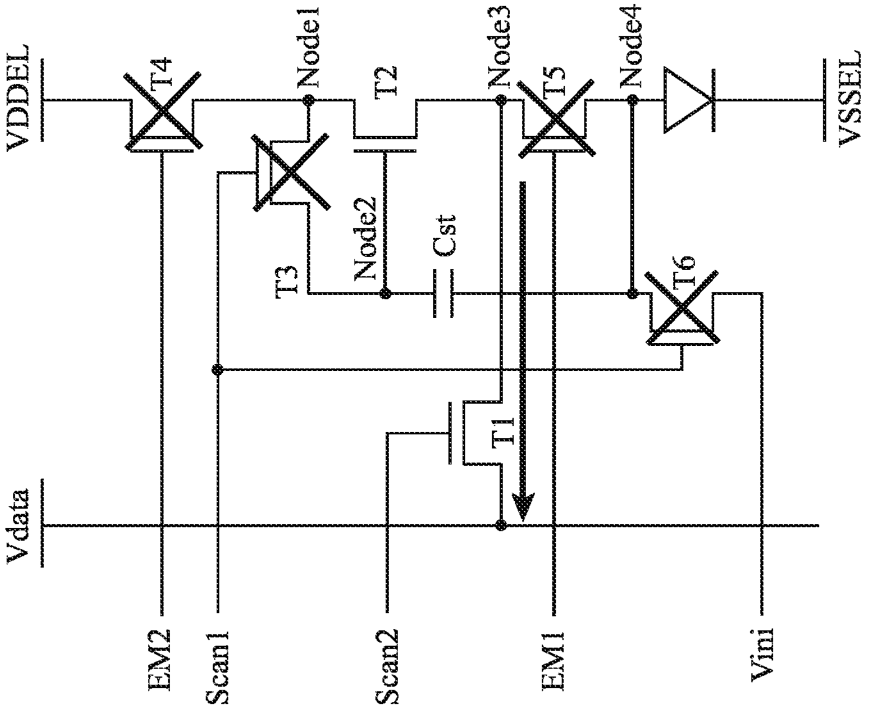
FIGS. 11A-11D are diagrams showing the configuration of the display pixel of FIG. 4 during the different phases shown in FIG. 10 in accordance with an embodiment.
Figure 11A:
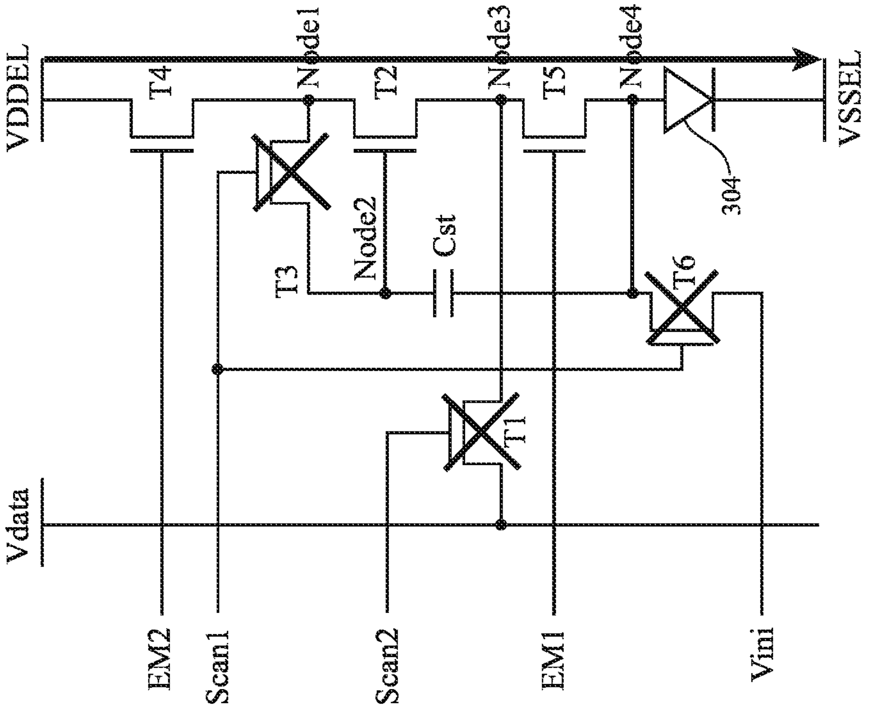
Figure 11D:
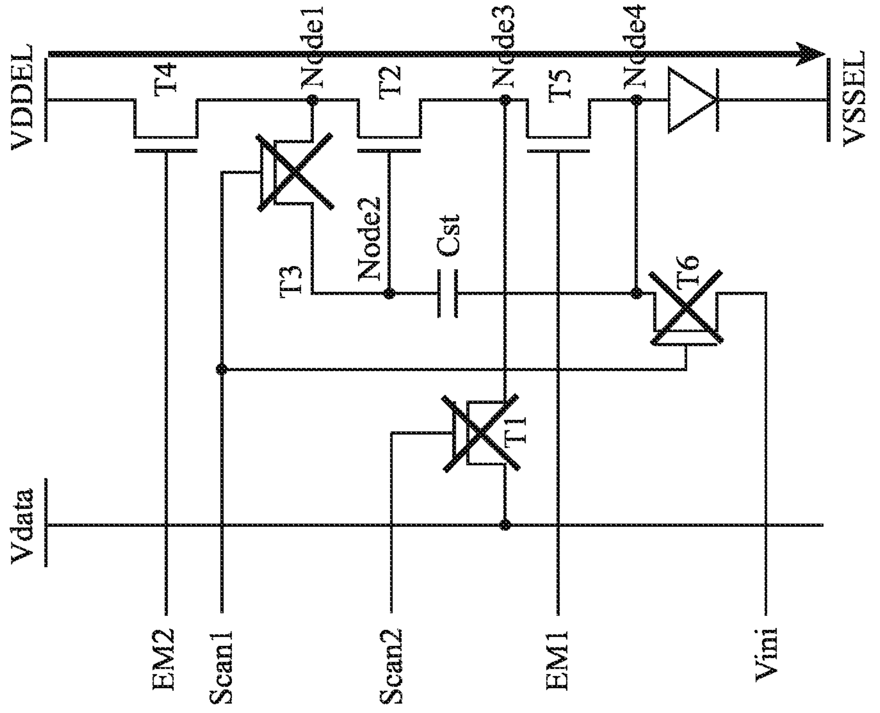

Since on-bias stress is applied during the data refresh period, on-bias stress may also be applied during the vertical blanking period to help maintain balance in terms of biasing the pixel transistors. FIG. 10 is a timing diagram illustrating how an on-bias stress phase can be inserted before the anode reset phase during the vertical blanking period (e.g., FIG. 10 expands upon FIG. 9 by inserting an on-bias stress phase immediate before the anode reset phase). FIGS. 11A-11D illustrate the configuration of pixel 22 during the various phases of operation shown in FIG. In particular, FIGS. 11A and 11D illustrate the emission phase, which is identical to the emission phase described in connection with FIGS. 6D and 9B, and therefore need not be iterated.

As shown in FIG. 10, signal EM1 may be deasserted prior to time t1, which prepares pixel 22 for the on-bias stress. At time t1, signal Scan2 is asserted and marks the beginning of the on-bias stress phase. FIG. 11B illustrates the configuration of pixel 22 during this time. As shown in FIG. 11B, only transistors T1 and T2 are turned on. Configured in this way, Node3 will be biased to Vdata using transistor T1.

Figure 11C:
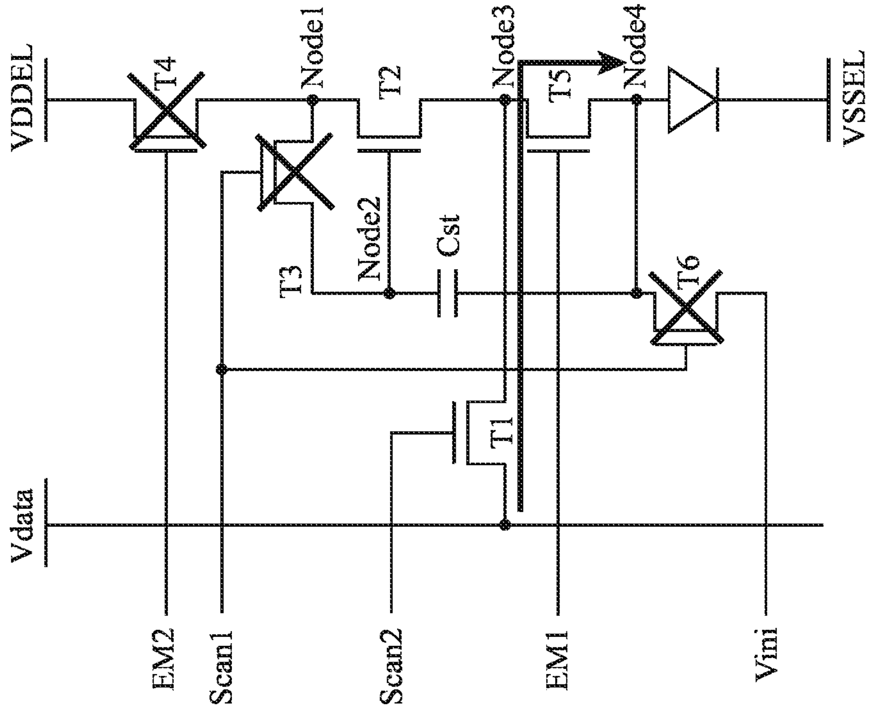

At time t2, signal EM1 is asserted (e.g., EM1 is driven high) to turn on transistor T5, which marks the end of the on-bias stress phase and the beginning of the anode reset phase. FIG. 11C illustrates the configuration of pixel 22 during this time. As shown in FIG. 11C, transistors T1 and T5 are both on, so diode anode terminal Node4 is reset to Vdata. At time t3, signal Scan2 can be deasserted to mark the end of the anode reset phase. From time t4-t5, emission signals EM1 and EM2 are both high to allow the emission current to flow. In general, an on-bias stress phase may accompany and immediately precede any number of anode reset operations during the extended vertical blanking period to help replicate and mirror the on-bias stress throughout the operation of display 14.

Figure 12:
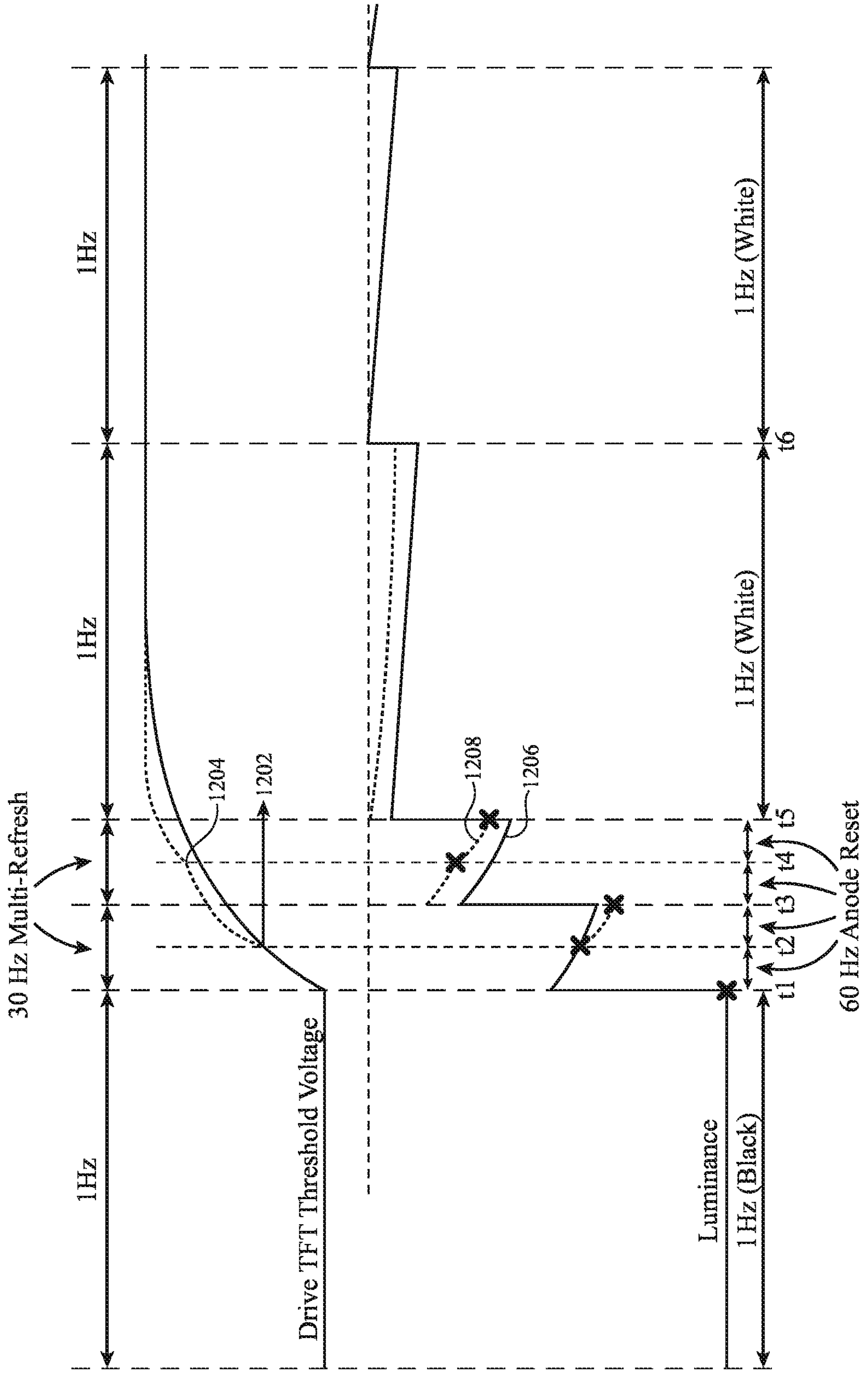
FIG. 12 is a diagram illustrating how multiple anode reset and on-bias stress operations can be inserted during multi-refresh driving schemes to help reduce first frame dimming in accordance with an embodiment.

In accordance with another suitable embodiment, multiple data refreshes and multiple anode reset operations may be performed when display 14 is transitioning from a black frame to a white frame (or in general, when display 14 is transitioning from one gray level to another). FIG. 12 is a diagram illustrating how multiple anode reset and on-bias stress operations can be inserted during multi-refresh driving schemes to help reduce first frame dimming. The top waveform shows how the threshold voltage of drive transistor T2 can change when transitioning from a black frame to a white frame. The bottom waveform shows how the luminance of display 14 can change as a result of performing multiple data refreshes and/or anode resets when transitioning from a black frame to a white frame.

In the example of FIG. 12, at least two data refreshes can be performed at 30 Hz (e.g., at time t1 and t3). At each of time t1 and t3, the four phases of FIGS. 5-6 can be carried out. Solid curves 1202 and 1206 illustrate the threshold voltage tracking and the luminance behavior, respectively, if only the two data refreshes are performed. Performing more than one data refresh enables enhanced Vth tracking and therefore a better luminance response that minimizes first frame dimming.

In addition to the multi-refresh operation, additional anode reset+on-bias stress operations may be performed at 60 Hz (e.g., at time t1, t2, t3, t4, and t5). The anode reset rate may be greater than the multi-refresh rate. During each of these times (as indicated by "X" in FIG. 12), the on-bias stress and anode reset may be applied as shown in FIG. 10-11. Dotted curves 1204 and 1208 illustrate the threshold voltage tracking and the luminance behavior, respectively, if the 30 Hz data refreshes and 60 Hz anode reset+on-bias stress are performed. As shown by curve 1204, Vth tracking is further improved by the additional on-bias stress applied, which helps with faster Vth settling. As shown by curve 1208, the luminance at time t3 is closer to the target level, thereby providing better first frame performance.

The example of FIG. 12 in which the anode reset rate is twice the multi-refresh rate is merely illustrative. In another suitable arrangement, the anode reset rate can be three times the multi-refresh rate. Configured in this way, the frequency of on-bias stress is increased between each successive data refresh phase, which can provided even faster Vth settling and further improve first frame performance. In yet other suitable arrangements, the anode reset can be any integer multiple of the data refresh rate (e.g., at least four times greater, at least eight times greater, more than ten times, etc.).

Typically, during the emission phase, the brightness of display 14 can be adjusted via pulse width modulation (PWM). In conventional display driving schemes, signal EM2 is pulsed repeatedly and has a duty cycle that is adjustable to control the brightness while signal EM1 remains high without toggling. If signal EM1 remains high (which turns on transistor t5), it is possible for excess current to leak through transistor T5, which results in a poor black level. In order to mitigate this issue, signals EM1 and EM2 may be toggled simultaneously and in synchronization with one another.

Figure 13:
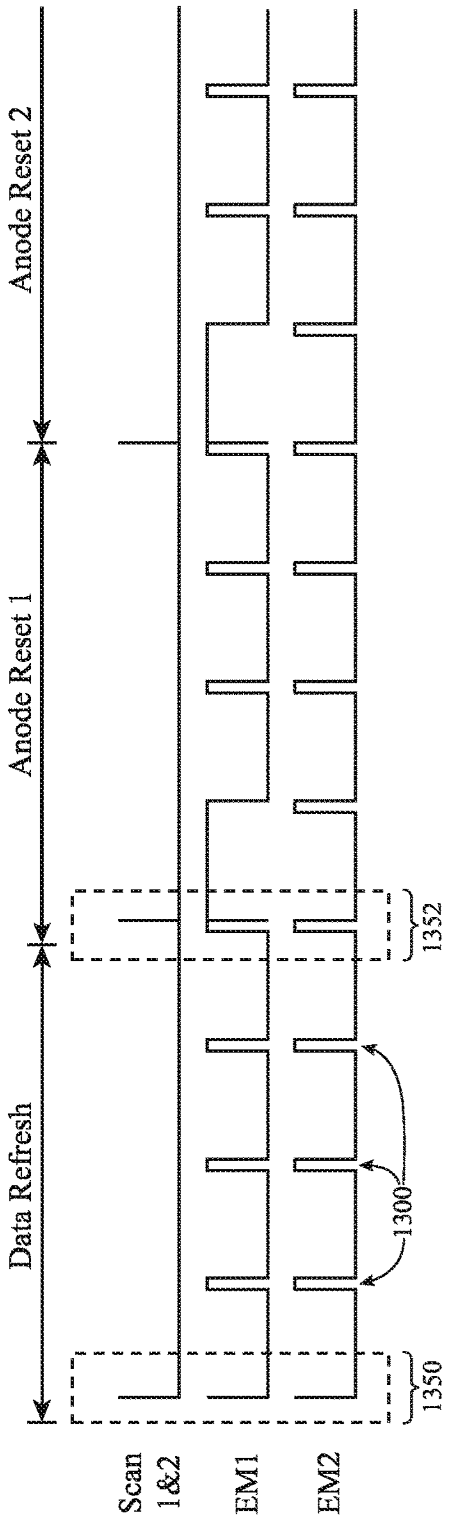
FIG. 13 is a timing diagram illustrating how first and second emission signals may be simultaneously toggled to help mitigate poor gray tracking issues during the data refresh phase in accordance with an embodiment.

FIG. 13 is a timing diagram illustrating how the EM1 and EM2 pulses 1300 can have the same duty cycle and are in-phase with each other. Deasserting EM1 at the same time as EM2 turns off transistor T5, thereby cutting off the leakage current path (e.g., there is not direct current path from Node1 to the diode when both EM1 and EM2 are low). The number of pulses and the pulse width can be tuned to output the desired luminance level of the display. Details of time period 1350 are shown in FIG. 5 and also FIG. 12 if multi-refresh schemes are supported.

The behavior of emission signals EM1 and EM2 may also be similar during the anode reset phases. During the anode reset phase, signal EM1 has to be asserted for a longer period of time (see, e.g., FIG. 8B). As shown in FIG. 13, signal EM1 may be high for substantially a quarter of the whole anode reset period (e.g., during the first PWM period). For the remaining three-quarters of the anode reset period, signals EM1 and EM2 may be toggled together.

Figure 14:
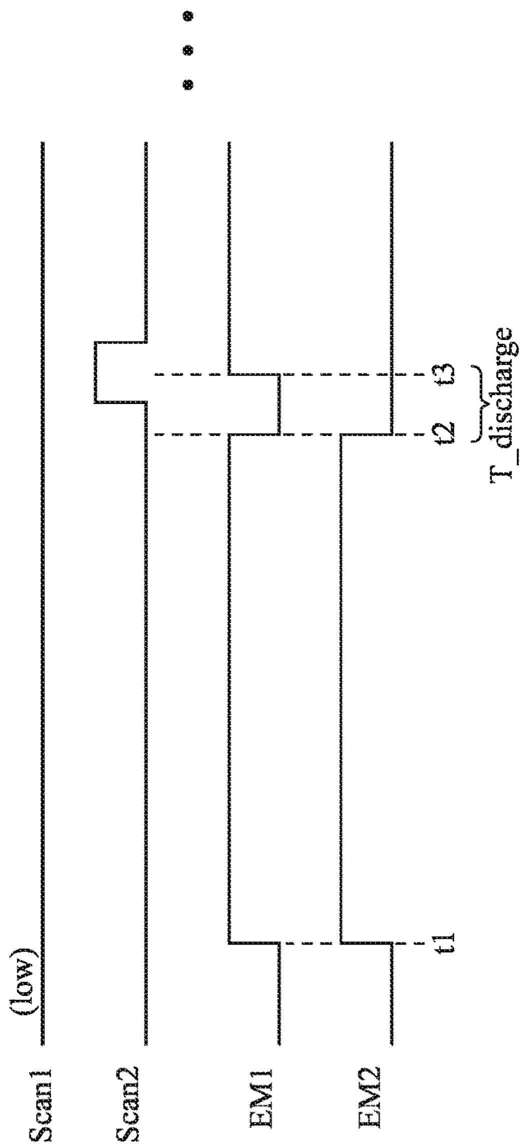
FIG. 14 is a timing diagram illustrating how first and second emission signals may have different duty cycles only during a first PWM (pulse width modulation) period of the anode reset phase to help minimize leakage in accordance with an embodiment.

Details of time period 1352 at the beginning of each anode reset period is shown in FIG. 14. As shown in FIG. 14, signals EM1 and EM2 are simultaneously asserted (e.g., EM1 and EM2 are driven high) at time t1. At time t2, signals EM1 and EM2 are simultaneously deasserted and signal Scan2 is pulsed high. During this time from t2 to t3, Vdata will be biased to a low voltage and both Node1 and Node3 will then be discharged via transistor T1 to the low voltage. This operation is similar to the on-bias stress operation described in connection with FIGS. 5-6. By discharging Node1 and Node3 through transistor T1, there is no more charge to leak from Node1 to the diode even if signal EM1 goes high afterwards (at time t3). The period between t2 and t3 is therefore sometimes referred to as the discharge time period T_discharge. As described above, for the rest of the anode reset period, signals EM1 and EM2 have the same duty cycle, so there is no direct current path from Node1 to the diode either.

The various ways for operating display 14 described in connection with FIGS. 5-14 are not mutually exclusive and can be used in conjunction with one another in a single embodiment to help reduce flicker, improve first frame performance, and improve better black levels in for low-refresh-rate displays.

The foregoing is merely illustrative and various modifications can be made to the described embodiments. The foregoing embodiments may be implemented individually or in any combination.

What is claimed is:

1. A display pixel comprising:
a light-emitting diode;
a drive transistor coupled in series with the light-emitting diode;
an emission transistor coupled in series between the drive transistor and the light-emitting diode; and
a switching transistor configured to reset an anode of the light-emitting diode, wherein the switching transistor is activated multiple times during a vertical blanking period.

2. The display pixel of claim 1, further comprising:
an initialization transistor coupled between an initialization line and a gate terminal of the drive transistor.

3. The display pixel of claim 2, wherein the initialization transistor comprises a semiconducting-oxide transistor and wherein the drive transistor comprises a silicon transistor.

4. The display pixel of claim 2, wherein the initialization transistor comprises an n-type semiconducting-oxide transistor and wherein the drive transistor comprises a p-type silicon transistor.

5. The display pixel of claim 1, further comprising
a semiconducting-oxide transistor coupled between a gate terminal and a source-drain terminal of the drive transistor, wherein the drive transistor comprises a silicon transistor.

6. The display pixel of claim 1, further comprising:
a capacitor having a first terminal coupled to a positive power supply line and having a second terminal coupled to the anode of the light-emitting diode.

7. The display pixel of claim 6, further comprising:
an additional emission transistor coupled in series between the positive power supply line and the drive transistor.

8. The display pixel of claim 7, wherein at least one of the emission transistor and the additional emission transistor is activated during the vertical blanking period.

9. The display pixel of claim 7, wherein during at least a portion of the vertical blanking period, the emission transistor and the additional emission transistor are simultaneously activated.

10. The display pixel of claim 1, wherein the switching transistor is configured to load a data signal into the display pixel.

11. A method of operating a display having a plurality of pixels each with a light-emitting diode, the method comprising:
during a first period, outputting a first frame;
during a second period, outputting a second frame different than the first frame; and
during a transition period between the first period and the second period, performing multiple anode reset operations for resetting an anode of the light-emitting diode to a reset voltage in at least some of the pixels in the display.

12. The method of claim 11, wherein each pixel in the plurality of pixels further comprises:
a drive transistor; and
a switching transistor coupled to the drive transistor, wherein the switching transistor is activated during the multiple anode reset operations.

13. The method of claim 12, wherein each pixel in the plurality of pixels further comprises:
an initialization transistor coupled to a gate terminal of the drive transistor.

14. The method of claim 13, wherein the initialization transistor is also coupled to the anode of the light-emitting diode.

15. The method of claim 13, wherein the drive transistor comprises a first silicon transistor and wherein the switching transistor comprises a second switching transistor.

16. The method of claim 13, wherein the drive transistor comprises a silicon transistor and wherein the initialization transistor comprises a semiconducting-oxide transistor.

17. The method of claim 13, wherein the switching transistor comprises a silicon transistor and wherein the initialization transistor comprises a semiconducting-oxide transistor.

18. The method of claim 13, wherein the switching transistor is coupled between the anode of the light-emitting diode and a first voltage line, and wherein the initialization transistor is coupled between the gate terminal of the drive transistor and a second voltage line different than the first voltage line.

19. The method of claim 11, further comprising:
during the transition period between the first period and the second period, performing multiple data refresh operations for loading data into at least some of the pixels in the display.

20. The method of claim 19, wherein:
during the transition period, the data refresh operations are performed at a first frequency; and
during the transition period, the anode reset operations are performed at a second frequency different than the first frequency.

* * * * *